(12) United States Patent
Kizhakkepat et al.

(10) Patent No.: US 10,858,094 B2
(45) Date of Patent: Dec. 8, 2020

(54) METHOD OF BLADE FOLD FOR TILTROTOR AIRCRAFT

(71) Applicant: Bell Helicopter Textron Inc., Fort Worth, TX (US)

(72) Inventors: Amarjit Kizhakkepat, Fort Worth, TX (US); Glenn Alan Shimek, Kennedale, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 416 days.

(21) Appl. No.: 16/030,406

(22) Filed: Jul. 9, 2018

(65) Prior Publication Data

US 2020/0010183 A1    Jan. 9, 2020

(51) Int. Cl.
*B64C 27/50* (2006.01)
*B64C 29/00* (2006.01)
*B64C 3/56* (2006.01)

(52) U.S. Cl.
CPC ............. *B64C 27/50* (2013.01); *B64C 3/56* (2013.01); *B64C 29/0033* (2013.01)

(58) Field of Classification Search
CPC ......... B64C 27/50; B64C 27/00; B64C 27/52; B64C 3/56
USPC .......................................................... 244/49
See application file for complete search history.

(56) References Cited

U.S. PATENT DOCUMENTS

| | | |
|---|---|---|
| 3,101,785 A | 8/1963 | Leoni |
| 3,135,333 A * | 6/1964 | Cruz ................... B64C 27/50 |
| | | 416/143 |
| 3,254,724 A * | 6/1966 | Brooke ................... B64C 27/50 |
| | | 416/143 |
| 3,404,852 A | 10/1968 | Sambell et al. |
| 3,484,175 A | 12/1969 | Vacca et al. |

(Continued)

FOREIGN PATENT DOCUMENTS

| | | | | |
|---|---|---|---|---|
| CA | 3015861 A1 | * | 9/2017 | ............. B64C 39/12 |
| CA | 2979628 A1 | * | 3/2018 | ............. B64C 11/28 |

(Continued)

OTHER PUBLICATIONS

StratPost, "StratPost: V-22 Blade Fold and Wing Stow," published Dec. 4, 2011, URL: <https://www.youtube.com/watch?v=UaiQxdKuSh8>, Retrieved: Jul. 9, 2018.

*Primary Examiner* — Christopher P Ellis
(74) *Attorney, Agent, or Firm* — Shackelford, Bowen, McKinley & Norton, LLP

(57) ABSTRACT

A method of blade fold for a tiltrotor aircraft includes configuring the tiltrotor aircraft in a flight ready position with a rotor system in an inverted-Y position, unlocking a first rotor blade of the rotor system to permit the first rotor blade to pivot relative to a yoke of the rotor system, restraining the first rotor blade to allow the first rotor blade to pivot relative to the yoke as the yoke is rotated, rotating the rotor system in a first direction so that the first rotor blade pivots closer to a second rotor blade, rotating the rotor system in a second direction to orient the rotor system into a modified inverted-Y position, unlocking a third rotor blade to allow the third rotor blade to pivot relative to the yoke as the yoke is rotated, and rotating the rotor system in the second direction so that the third rotor blade pivots closer to the second rotor blade.

20 Claims, 5 Drawing Sheets

(56) References Cited

U.S. PATENT DOCUMENTS

| | | | |
|---|---|---|---|
| 3,625,631 | A | 12/1971 | Covington, Jr. et al. |
| 3,874,817 | A | 4/1975 | Ferris |
| 4,691,878 | A * | 9/1987 | Vaughan ............... B64C 3/56 |
| | | | 244/49 |
| 4,712,978 | A | 12/1987 | Tiemann |
| 5,085,315 | A | 2/1992 | Sambell |
| 6,036,442 | A | 3/2000 | Certain et al. |
| 9,156,545 | B1 | 10/2015 | Fenny et al. |
| 2006/0067822 | A1 * | 3/2006 | D'Anna ............... B64C 27/50 |
| | | | 416/98 |
| 2012/0292456 | A1 | 11/2012 | Hollimon et al. |
| 2017/0327205 | A1 * | 11/2017 | Paulson ............ B64C 29/0033 |
| 2018/0079487 | A1 * | 3/2018 | Ivans .............. B64C 29/0033 |
| 2018/0079500 | A1 * | 3/2018 | Foskey ................ B64C 5/02 |
| 2018/0229830 | A1 * | 8/2018 | Foskey ............... B64C 11/28 |
| 2019/0185142 | A1 * | 6/2019 | Paulson .............. B64C 27/50 |
| 2019/0185150 | A1 * | 6/2019 | Paulson .............. B64C 27/48 |
| 2019/0185151 | A1 * | 6/2019 | Paulson .............. B64C 27/48 |
| 2019/0185152 | A1 * | 6/2019 | Paulson .............. B64C 27/50 |
| 2019/0185153 | A1 * | 6/2019 | Paulson .............. B64C 27/48 |
| 2019/0233096 | A1 * | 8/2019 | Baldwin .............. B64C 27/48 |
| 2019/0344884 | A1 * | 11/2019 | Myers ................ B64C 27/51 |
| 2019/0389569 | A1 * | 12/2019 | Paulson .............. F16H 37/122 |
| 2020/0039633 | A1 * | 2/2020 | Cravener ............. B64C 11/28 |
| 2020/0223532 | A1 * | 7/2020 | Paulson .............. B64C 11/28 |

FOREIGN PATENT DOCUMENTS

| | | | |
|---|---|---|---|
| FR | 2836889 A1 * | 9/2003 | ............ B64C 27/50 |
| FR | 2991291 A1 * | 12/2013 | ............ B64C 27/50 |

* cited by examiner

METHOD OF BLADE FOLD FOR TILTROTOR AIRCRAFT

BACKGROUND

This section provides background information to facilitate a better understanding of the various aspects of the disclosure. It should be understood that the statements in this section of this document are to be read in this light, and not as admissions of prior art.

Rotorcraft and tiltrotor aircraft are often transported or stored on vessels or in areas where storage space is limited. In order to reduce the space that each aircraft occupies such that a maximum number of aircraft can be accommodated within the limited storage space, blade assemblies of some rotor systems can be folded so that each rotor blade is generally parallel with each other rotor blade in order to reduce the overall profile of the blade assembly. Typically, each rotor blade is folded about a single pivot point positioned outboard of a yoke. Methods of folding blades often involve personnel climbing onto platforms or ladders to interact with the blade assembly and fold the rotor blades. Some methods require the use of specialized tools that allow personnel to reach the rotor blades and maneuver them. Climbing onto ladders and using large tools adds complexity to the process of folding the rotor blades. In some situations, such as inclement weather on aircraft carriers, climbing onto a ladder to work on the aircraft can be very dangerous.

SUMMARY

A method of blade fold for a tiltrotor aircraft includes configuring the tiltrotor aircraft in a flight ready position with a rotor system in an inverted-Y position, unlocking a first rotor blade of the rotor system to permit the first rotor blade to pivot relative to a yoke of the rotor system, restraining the first rotor blade to allow the first rotor blade to pivot relative to the yoke as the yoke is rotated, rotating the rotor system in a first direction so that the first rotor blade pivots closer to a second rotor blade, locking the first rotor blade in a folded position, rotating the rotor system in a second direction to orient the rotor system into a modified inverted-Y position, unlocking a third rotor blade to allow the third rotor blade to pivot relative to the yoke as the yoke is rotated, rotating the rotor system in the second direction so that the third rotor blade pivots closer to the second rotor blade, and locking the third rotor blade in a folded position.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
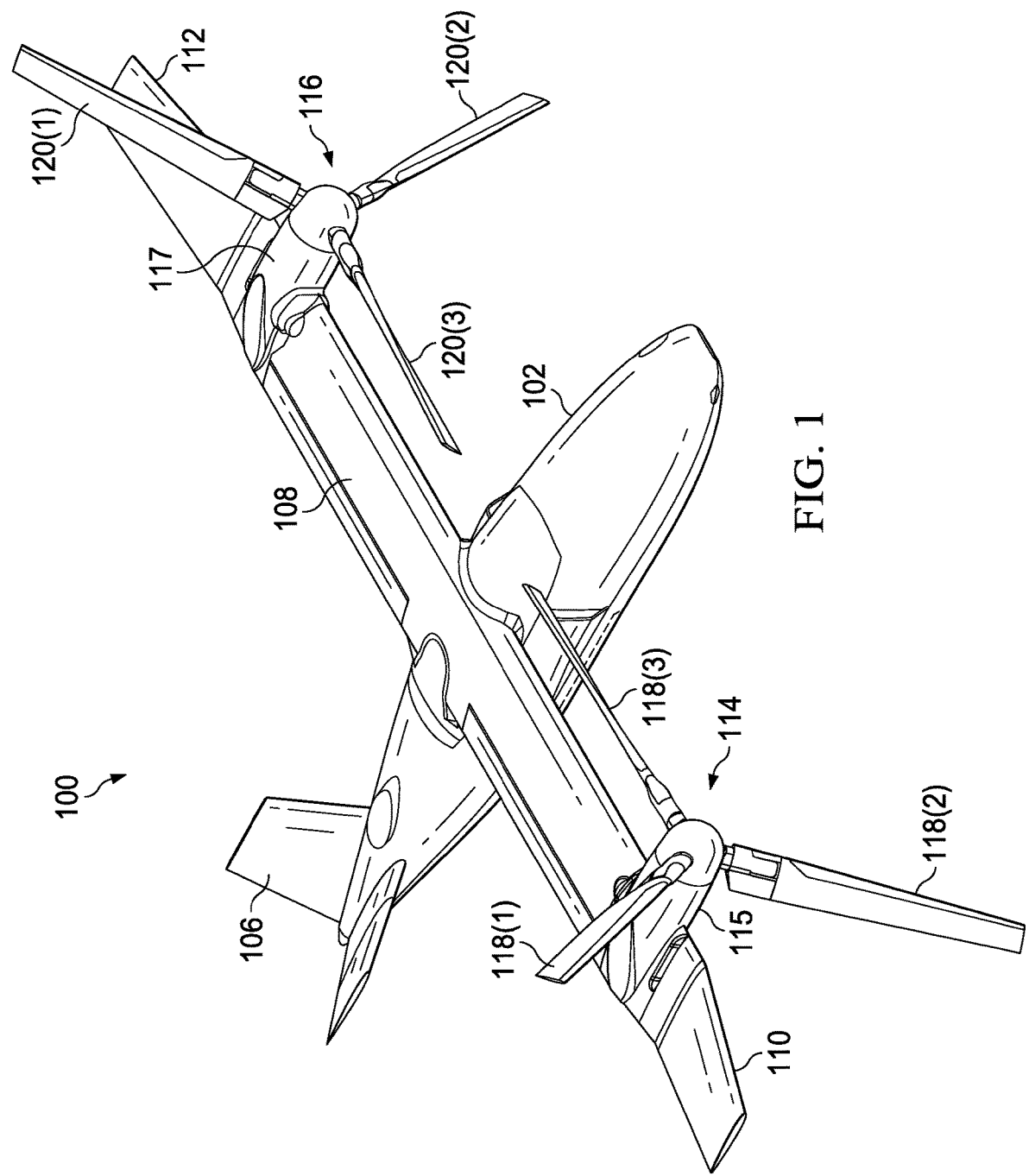
FIG. 1 is a perspective view of an illustrative tiltrotor aircraft configured in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 2:
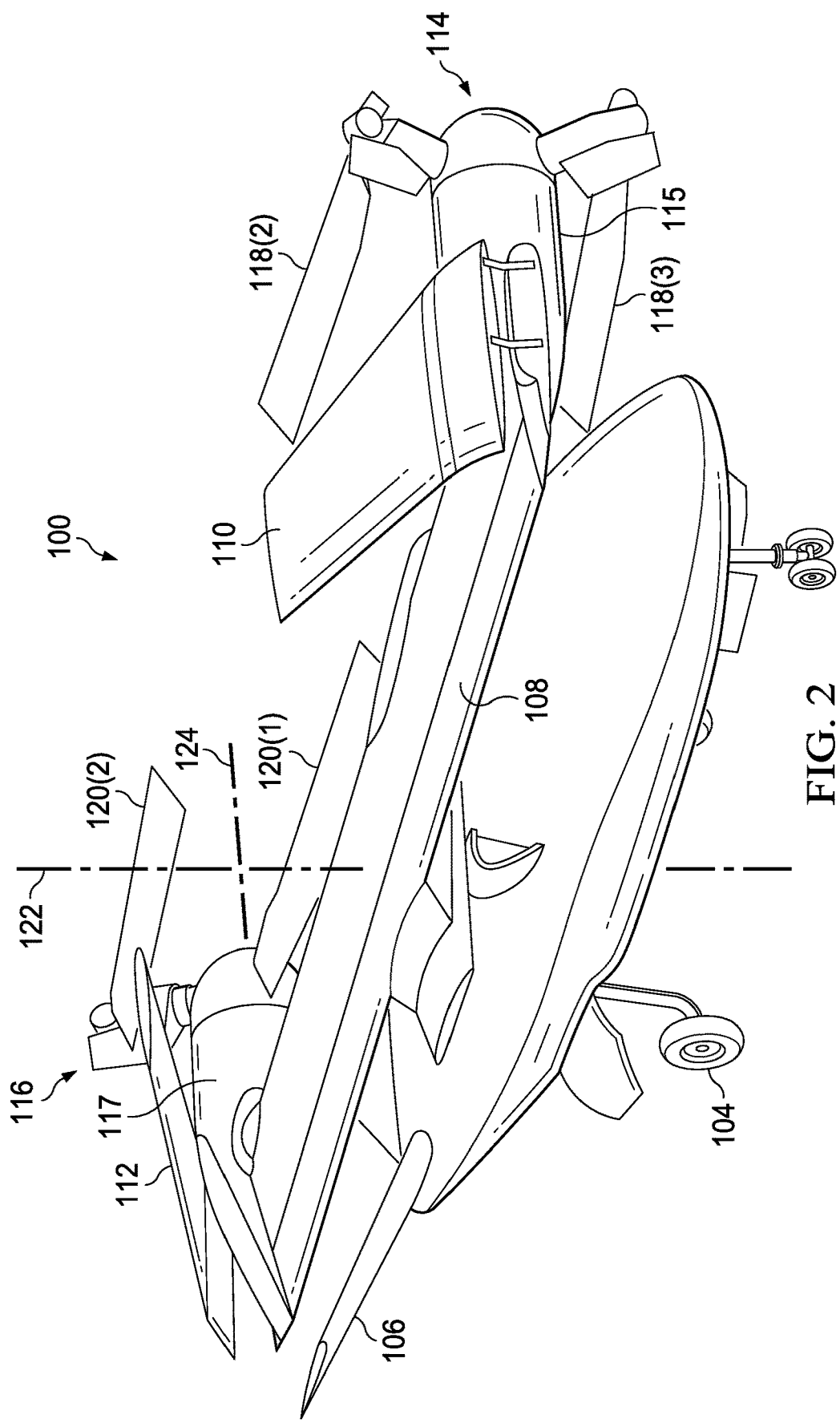
FIG. 2 is a perspective view of an illustrative tiltrotor aircraft configured in a stowed position according to aspects of the disclosure.

Referring to FIGS. 1 and 2, an illustrative tiltrotor aircraft 100 is shown. FIG. 1 is a perspective view of the tiltrotor aircraft 100 configured in a flight ready position and FIG. 2 is a perspective view of the tiltrotor aircraft 100 configured in a stowed position. The tiltrotor aircraft 100 includes a fuselage 102, landing gear 104, a tail member 106, a wing 108, a wing tip 110, a wing tip 112, a rotor system 114, and a rotor system 116. The rotor system 114 is housed within a nacelle 115 located on an end portion of the wing 108 that is proximal the wing tip 110. The rotor system 116 is housed within nacelle 117 located on an opposite end portion of the wing 108 that proximal the wing tip 112. The wing tip 110 is pivotable at a location on the wing 108 that is outboard the nacelle 115. The wing tip 112 is pivotable at a location on the wing 108 that is outboard the nacelle 117. Nacelles 115, 117 are pivotable between a helicopter mode where the rotor systems 114, 116 are generally vertical and an airplane mode where the rotor systems 114, 116 are generally horizontal. The nacelles 115, 117 are substantially symmetric relative to each other about the fuselage 102.

The rotor system 114 includes a plurality of foldable rotor blades 118(1)-(3) and the rotor system 116 includes a plurality of foldable rotor blades 120(1)-(3). The rotor blades 118, 120 may rotate in opposite directions to cancel torque associated with the operation of each rotor system 114, 116. An angle of the pivotable nacelles 115, 117 relative to the wing 108, as well as the pitch of rotor blades 118, 120, can be adjusted in order to selectively control direction, thrust, and lift of the tiltrotor aircraft 100. The rotor systems 114, 116 are illustrated in the context of the tiltrotor aircraft 100; however, a singular rotor system with foldable rotor blades can be implemented on other non-tilting rotor and helicopter rotor systems. It should also be appreciated that teachings relative to the tiltrotor aircraft 100 may apply to other aircraft such as airplanes and unmanned aircraft which would benefit from folding rotor blades.

The fuselage 102 represents a body of the tiltrotor aircraft 100 and may be coupled to the rotor systems 114, 116 such that the rotor systems 114, 116, along with the rotor blades 118, 120, may move tiltrotor aircraft 100 through the air. The landing gear 104 supports the tiltrotor aircraft 100 when the tiltrotor aircraft 100 is landing or when the tiltrotor aircraft 100 is at rest on the ground. FIG. 2 illustrates a vertical axis 122 that is generally perpendicular to a longitudinal axis 124 of the wing 108. An intersection of the vertical axis 122 and the longitudinal axis 124 is generally positioned at an intersection of the fuselage 102 and the wing 108. FIG. 1 represents tiltrotor aircraft 100 in flight ready position in an airplane mode. FIG. 2 represents tiltrotor aircraft 100 in a stowed position with the rotor blades 118 folded generally parallel to each other and the rotor blades 120 folded generally parallel to each other in order to reduce dimensions of the tiltrotor aircraft 100 to whatever degree is required in response storage space restrictions. In the stowed position, the wing 108 is swivelled approximately 90° to generally align with a length of the fuselage 102.

Referring to tiltrotor aircraft in general, each rotor system includes a mast driven by a power source (e.g., an engine or motor). Each rotor system also includes a yoke connected to the mast, with rotor blades indirectly connected to the yoke with bearings. The bearings may be, for example, elastomeric bearings constructed from a rubber type material that absorb vibration. The bearings may include inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other of the bearings. The bearings accommodate forces acting on the rotor blades allowing each rotor blade to flex with respect to the yoke/mast and other rotor blades. The weight of the rotor blades and the lift of rotor blades generated by action of the rotor blades may result in transverse forces on the yoke and other components. Examples of transverse forces include forces resulting from flapping and coning of the rotor blades. Flapping can refer to an up-and-down movement of a rotor blade positioned at a right angle to the plane of rotation or can refer to a gimballing of the hub or a teetering rotor. Coning generally refers to an upward flexing of a rotor blade due to lift forces acting on the rotor blade. Generally speaking, the hub is not rigidly connected to the mast and a differential coning of the rotor blades can cause the hub to tilt relative to the mast.

The rotor blades may be subject to other forces, such as axial, lead/lag, and feathering forces. Axial forces generally refer to a centrifugal force on the rotor blades resulting from rotation of the rotor blades. Lead and lag forces generally refer to forces resulting from a horizontal movement of the rotor blades about a vertical pin that occur if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

FIGS. 3-8 illustrate a method of folding rotor blades of tiltrotor aircraft 100 according to aspects of the disclosure. FIGS. 3-8 will be discussed relative to tiltrotor aircraft 100 with the understanding that the method may be applied to other rotor aircraft (e.g. rotor-powered airplanes and helicopters). Some blade-fold methods require the use of specialized tools and equipment to maneuver rotor blades into or out of a folded position. For example, personnel who are configuring an aircraft for storage may have to climb onto ladders or platforms to handle a rotor blade. In some instances, special tools are required that must be attached to the rotor blade by personnel. The use of tools and equipment adds complexity to the blade-fold process and also makes the blade-fold process more dangerous for personnel. This danger is magnified in instances where the aircraft being worked on is located on an aircraft carrier in heaving seas. To limit the number of tools needed and eliminate the need to stand on ladders or platforms, methods discussed herein can be used.

Figure 3:
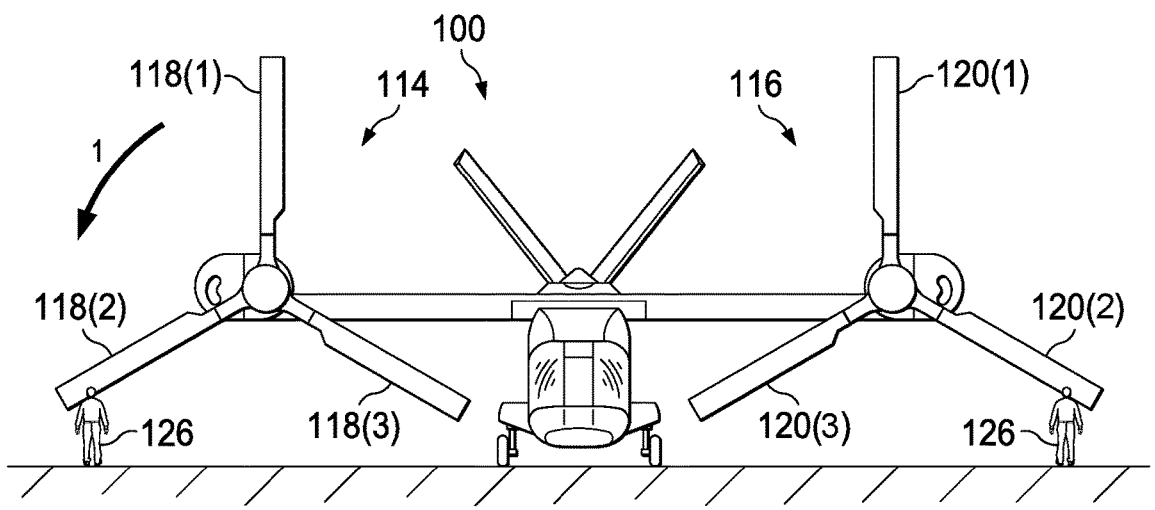
FIG. 3 is a view of a tiltrotor aircraft illustrating a starting position of a blade fold method according to aspects of the disclosure.

A method of folding rotor blades begins with tiltrotor aircraft 100 configured in airplane mode with rotor systems 114 and 116 oriented in the inverted-Y position as shown in FIG. 3. In the inverted-Y position, rotor blades 118(1) and 120(1) are oriented generally vertical and rotor blades 118(2), 118(3), 120(2), and 120(3) are oriented generally down forming the branches of the Y. Rotor blades 118(1), 120(1) are oriented generally vertical when axes along a length of the rotor blades are perpendicular to the ground or with twenty degrees of perpendicular. In the inverted-Y position, personnel 126 can reach rotor blades 118(2), 118 (3), 120(2), and 120(3) while standing on the ground. Personnel 126 may be one person or plurality of people. The method used to fold rotor blades 118 and is similar to the method used to fold rotor blades 120. For simplicity, the method will be discussed relative to rotor blades 118(2), 118(3) with the understanding that a similar process is used to fold rotor blades 120(2), 120(3).

Rotor blades are typically connected to the yoke such that they do not pivot relative to the yoke as the yoke rotates during operation. In order to permit rotor blade 118(2) to fold relative to the yoke, rotor blade 118(2) must be unlocked. In some embodiments, rotor blade 118(2) is unlocked by removing a pin. For example, rotor blade 118(2) may be secured to the yoke by two pins. Removal of one of the two pins allows rotor blade 118(2) to pivot about the other of the two pins. In some embodiments, the pin is removed automatically by an actuator. In some embodiments, the pin is removed manually (e.g., by personnel 126).

Figure 4:
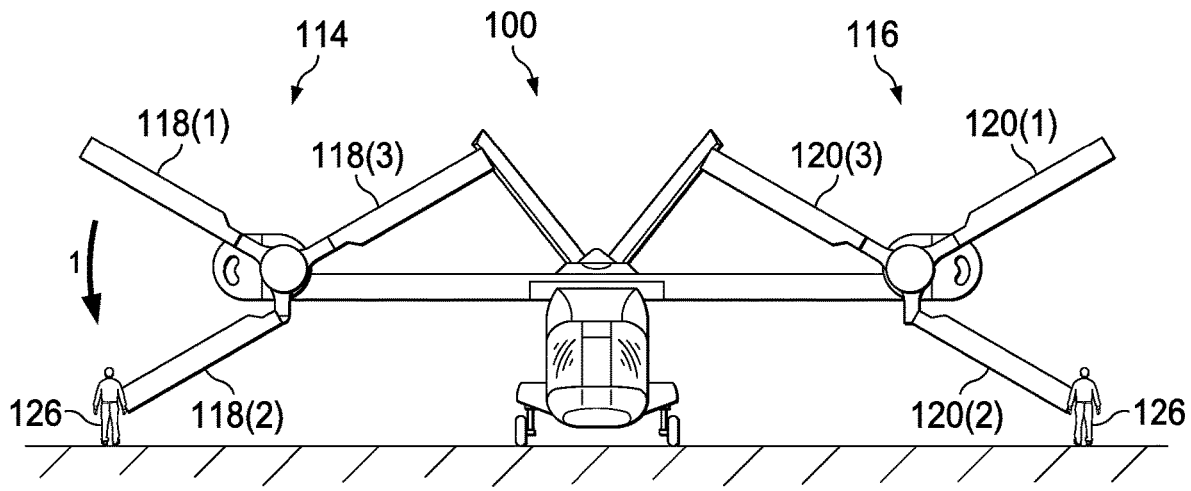
FIG. 4 is a view of the tiltrotor aircraft of FIG. 3 illustrating an intermediate position of a blade fold method according to aspects of the disclosure.
Figure 5:
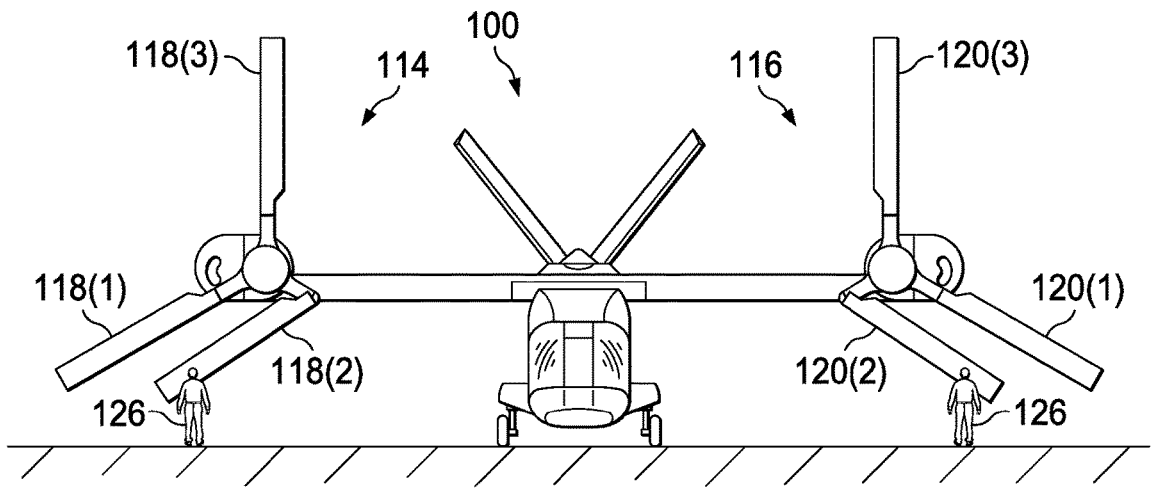
FIG. 5 is a view of the tiltrotor aircraft of FIG. 3 illustrating an intermediate position of a blade fold method according to aspects of the disclosure.

After rotor blade 118(2) has been unlocked, rotor system 114 is rotated in the direction of arrow 1 while personnel 126 holds onto a portion of rotor blade 118(2). Rotor system 114 may be rotated by a motor on board tiltrotor aircraft 100, such as a rotor phasing unit, or via a motor or tool that is coupled to a gearbox of rotor system 114. Rotor blade 118(2) may be held anywhere along its length. Holding rotor blade 118(2) while rotor system 114 rotates results in rotor blade 118(2) pivoting relative to the yoke of rotor system 114. FIG. 4 shows an intermediate position of rotor blade 118(2) where rotor blade 118(2) has begun to pivot about the yoke. The intermediate position is meant to describe the transitionary position of rotor blade 118(2) as rotor blade 118(2) moves between the unfolded and folded positions. FIG. 5 shows rotor blade 118(2) in the folded position after rotation of rotor system 114 is complete. In the folded position, rotor blade 118(2) is generally parallel with rotor blade 118(1). A rotor blade is generally parallel with another rotor blade when axes along lengths of the rotor blades are parallel to one another or within twenty degrees of being parallel. Once rotor blade 118(2) has reached the folded position, rotor blade 118(2) is locked in place. Rotor blade 118(2) can be locked in place by various mechanisms, such as, for example, latches, pinned connections, retaining straps, and the like.

Figure 6:
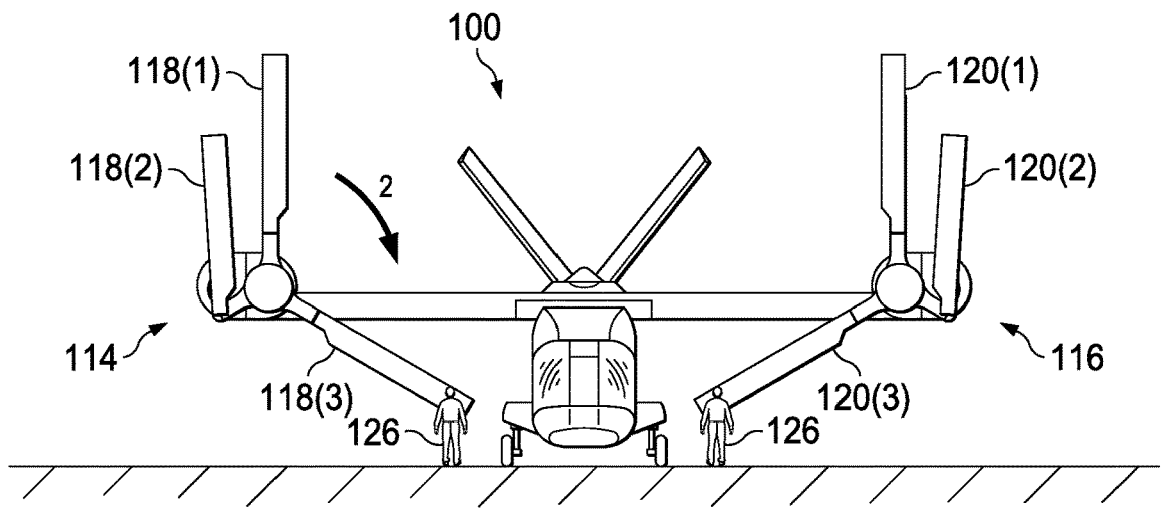
FIG. 6 is a view of the tiltrotor aircraft of FIG. 3 illustrating an intermediate position of a blade fold method according to aspects of the disclosure.
Figure 7:
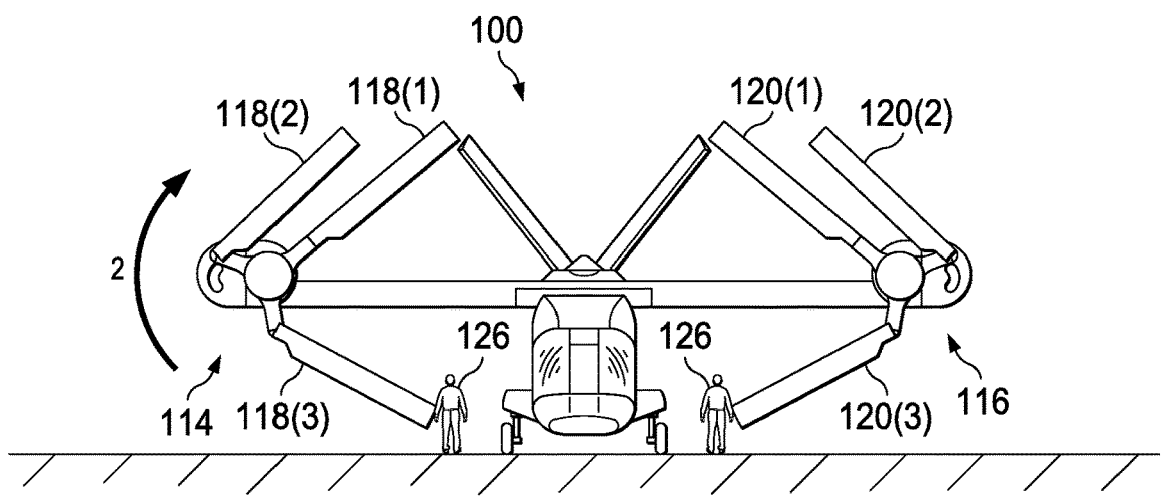
FIG. 7 is a view of the tiltrotor aircraft of FIG. 3 illustrating an intermediate position of a blade fold method according to aspects of the disclosure.
Figure 8:
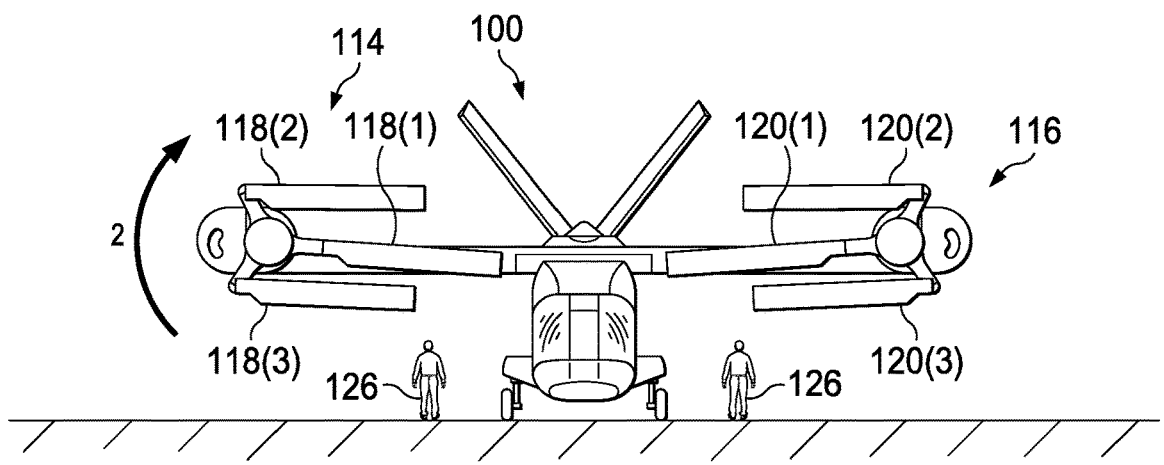
FIG. 8 is a view of the tiltrotor aircraft of FIG. 3 illustrating an ending position of a blade fold method according to aspects of the disclosure.

With rotor blade 118(2) in the folded position, rotor system 114 next rotates to a modified inverted-Y position with rotor blade 118(2) oriented in the folded position as shown in FIG. 6. In the modified inverted-Y position, rotor blades 118(1), 118(2) are oriented generally vertical and rotor blade 118(3) is oriented in a similar position as in the inverted-Y position. Rotor blades 118(1), 118(2) are oriented generally vertical when axes along a length of the rotor blades are perpendicular to the ground or with twenty degrees of perpendicular. Next, rotor blade 118(3) is folded by rotating rotor system 114 in the direction of arrow 2. Folding rotor blade 118(3) is done in similar manner to rotor blade 118(2). Rotor blade 118(3) is first unlocked. After rotor blade 118(3) has been unlocked, rotor system 114 is rotated in the direction of arrow 2 while personnel 126 holds onto a portion of rotor blade 118(3). Rotor blade 118(3) may be held anywhere along its length. Holding rotor blade 118(3) while rotor system 114 rotates results in rotor blade 118(3) pivoting relative to the yoke of rotor system 114. FIG. 7 shows an intermediate position of rotor blade 118(3) where rotor blade 118(3) has begun to pivot. The intermediate position is meant to describe the transitionary position of rotor blade 118(3) as rotor blade 118(3) moves between the unfolded and folded positions. FIG. 8 shows rotor blade 118(3) in the folded position after rotation of rotor system 114 is complete. In the folded position, rotor blade 118(3) is generally parallel with rotor blades 118(1), 118(2). In some embodiments, rotor blades 118(1), 118(2), 118(3) are generally horizontal with the ground in the folded position. Rotor blades 118(1), 118(2), 118(3) are generally horizontal with the ground when an axis along a length of rotor blades 118(1), 118(2), 118(3) is parallel with the ground or within twenty degrees of parallel with the ground. Once rotor blade 118(3) has reached the folded position it is locked in place. Rotor blade 118(3) can be locked in place by various mechanisms, such as, for example, latches, pinned connections, retaining straps, and the like. In some embodiments, once rotor blades 118(2), 118(3), 120(2), and 120(3) have been folded as shown in FIG. 8, wing 108 may be pivoted about vertical axis 122 into the stowed position shown in FIG. 2. The tiltrotor aircraft 100 is then configured for storage.

Figure 9:
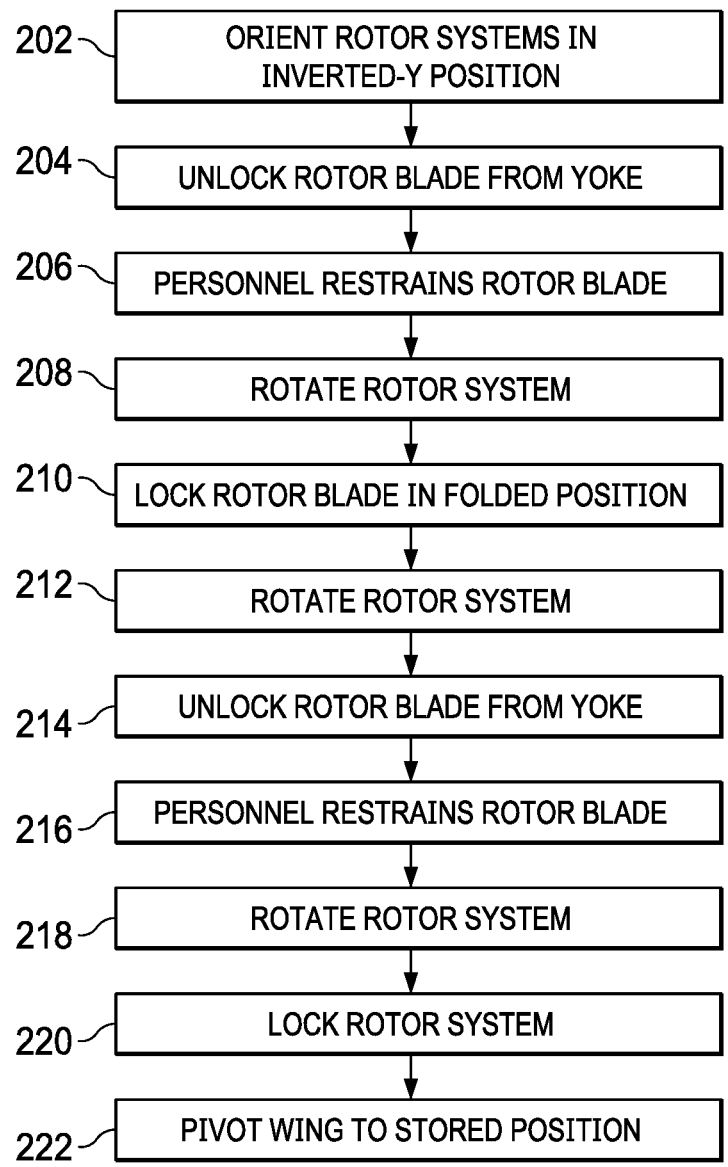
FIG. 9 is a flowchart illustrating a method of folding rotor blades of a tiltrotor aircraft according to aspects of the disclosure.

FIG. 9 is a flow chart illustrating a method 200 according to aspects of the disclosure. Method 200 is described relative to tiltrotor aircraft 100 of FIGS. 3-8. Method 200 begins at step 202 in which rotor systems 114, 116 are oriented in the inverted-Y position. For aircraft other than tiltrotor aircraft 100 it may be possible to begin method 200 without positioning the other aircraft's rotor system(s) in the inverted-Y position. For example, if the other aircraft's rotor blades are positioned high enough about the ground that the rotor tips do not touch the ground as they move through their rotation, it may not be necessary to start method 200 with the other aircraft's rotor system(s) in the inverted-Y position. After rotor systems 114, 116 are oriented in the inverted-Y position, method 200 proceeds to step 204.

In step 204, rotor blade 118(2) is unlocked from the yoke of rotor system 114 so that rotor blade 118(2) is free to pivot about the yoke. In some embodiments, personnel 126 removes or disengages a pin of rotor blade 118(2) from the yoke to unlock rotor blade 118(2). In some embodiments, removal of the pin is an automated function that is built into the design of the rotor system 114. After rotor blade 118(2) has been unlocked from the yoke, method 200 proceeds to step 206.

In step 206, personnel 126 restrains rotor blade 118(2). Rotor blade 118(2) may be restrained by personnel 126 by holding onto rotor blade 118(2) along a length of rotor blade 118(2). In some embodiments, personnel 126 may retain rotor blade 118(2) by fitting a tool or strap to rotor blade 118(2). In some embodiments, rotor blade 118(2) may be tethered to the ground or a ground support piece, such as a tie down or ground handling equipment. After rotor blade 118(2) has been restrained, method 200 proceeds to step 208.

In step 208, rotor system 114 is rotated in the direction of arrow 1. Rotor system 114 may be rotated by a motor of tiltrotor aircraft 100. For example, tiltrotor aircraft 100 may include a rotor phasing unit that is configured to rotate the rotor system 114 for various purposes such as maintenance and storage. In other embodiments, rotor system 114 may be rotated manually by personnel 126. Rotor system 114 may be rotated manually by coupling a tool to the rotor system 114. For example, an external motor may be coupled to a gearbox of the rotor system 114 to rotate rotor system 114. As rotor system 114 rotates, personnel 126 continues to restrain rotor blade 118(2) while rotor blade 118(1) rotates toward rotor blade 118(2). Once rotor blade 118(1) has rotated to the position shown in FIG. 4, rotation of rotor system 114 stops and method 200 proceeds to step 210.

In step 210, rotor blade 118(2) is locked in place in the folded position. Rotor blade 118(2) can be locked in place by various mechanisms, such as, for example, latches, pinned connections, retaining straps, and the like. For example, rotor blade 118(2) may latch into a component of rotor system 114 (e.g., the yoke). In other embodiments rotor blade 118(2) may be secured in place by connecting a retaining strap between rotor blade 118(2) and another component (e.g., rotor blade 118(1), the yoke, etc.). After rotor blade 118(2) has been locked into place, method 200 proceeds to step 212.

In step 212, rotor system 114 rotates in the direction of arrow 2 to the modified inverted-Y position as shown in FIG. 6. Once rotor system has rotated to the modified inverted-Y position, method 200 proceeds to step 214.

In step 214, rotor blade 118(3) is unlocked from the yoke of rotor system 114 so that rotor blade 118(3) is free to pivot about the yoke. In some embodiments, personnel 126 removes or disengages a pin of rotor blade 118(3) from the yoke. In some embodiments, removal of the pin is an automated function that is built into the design of the rotor system 114. After rotor blade 118(3) has been unlocked from the yoke, method 200 proceeds to step 216.

In step 216, personnel 126 restrains rotor blade 118(3). Rotor blade 118(3) may be restrained by personnel 126 by holding onto rotor blade 118(3) along a length of rotor blade 118(3). In some embodiments, personnel 126 may retain rotor blade 118(3) by fitting a tool or strap to rotor blade 118(3). In some embodiments, rotor blade 118(3) may be tethered to the ground or a ground support piece, such as a tie down or ground handling equipment. After rotor blade 118(3) has been restrained, method 200 proceeds to step 218.

In step 218, rotor system 114 is rotated in the direction of arrow 2. Rotor system 114 may be rotated by a motor of tiltrotor aircraft 100. For example, tiltrotor aircraft 100 may include a rotor phasing unit that is configured to rotate the rotor system 114 for various purposes such as maintenance and storage. In other embodiments, rotor system 114 may be rotated manually by personnel 126. Rotor system 114 may be rotated manually by coupling a tool to the rotor system 114. For example, an external motor may be coupled to a gearbox of the rotor system 114 to rotate rotor system 114. As rotor system 114 rotates, personnel 126 continues to restrain rotor blade 118(3) while rotor blades 118(1), 118(2) rotate toward rotor blade 118(3). Once rotor blade 118(1) has rotated to the position shown in FIG. 8, rotation of rotor system 114 stops and method 200 proceeds to step 220.

In step 220, rotor blade 118(3) is locked in place in the folded position. Rotor blade 118(3) can be locked in place by various mechanisms, such as, for example, latches, pinned connections, retaining straps, and the like. For example, rotor blade 118(3) may latch into a component of rotor system 114 (e.g. the yoke). In other embodiments rotor blade 118(3) may be secured in place by connecting a retaining strap between rotor blade 118(3) and another component (e.g., rotor blade 118(1), the yoke, etc.). After rotor blade 118(3) has been locked into place, method 200 proceeds to step 222. In step 222, wing 108 is pivoted about vertical axis 122 to the store position as shown in FIG. 2. Wing 108 may be pivoted by a motor within tiltrotor aircraft 100 or manually by personnel 126.

While method 200 was described relative to rotor blades 118(2), 118(3), the process of folding rotor blades 120(2), 120(3) is very similar. In some embodiments, rotor blades 120(2), 120(3) may be folded at the same time as rotor blades 118(2), 118(3), respectively. In some embodiments, rotor blades 120(2), 120(3) may be rotated before or after rotor blades 118(2), 118(3).

The description of method 200 is for illustrative purposed and is not intended to be limiting. For example, it will be understood by those having skill in the art that one or more steps of method 200 can be omitted or performed in a different order.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of blade fold for a tiltrotor aircraft, the method comprising:
   configuring the tiltrotor aircraft in a flight ready position with a rotor system in an inverted-Y position;
   unlocking a first rotor blade of the rotor system to permit the first rotor blade to pivot relative to a yoke of the rotor system;
   restraining the first rotor blade to allow the first rotor blade to pivot relative to the yoke as the yoke is rotated; and
   rotating the rotor system in a first direction so that the first rotor blade pivots closer to a second rotor blade.

2. The method of claim 1, further comprising locking the first rotor blade in a folded position.

3. The method of claim 2, wherein, when the first rotor blade is in the folded position, the first rotor blade is generally parallel to the second rotor blade.

4. The method of claim 2, wherein the locking the first rotor blade comprises latching the first rotor blade to the yoke.

5. The method of claim 2, wherein the locking the first rotor blade comprises securing the first rotor blade to the second rotor blade.

6. The method of claim 2, further comprising rotating the rotor system in a second direction to orient the rotor system into a modified inverted-Y position.

7. The method of claim 6, wherein in the modified inverted-Y position the first and second rotor blades are oriented generally vertically.

8. The method of claim 6, further comprising unlocking a third rotor blade to allow the third rotor blade to pivot relative to the yoke as the yoke is rotated.

9. The method of claim 8, further comprising restraining the third rotor blade to allow the third rotor blade to pivot relative to the yoke as the yoke is rotated.

10. The method of claim 9, further comprising rotating the rotor system in the second direction so that the third rotor blade pivots closer to the second rotor blade.

11. The method of claim 10, further comprising locking the third rotor blade in a folded position.

12. The method of claim 11, wherein, when the third rotor blade is in the folded position, the third rotor blade is generally parallel to the second rotor blade.

13. The method of claim 11, further comprising pivoting a wing upon which the rotor system is disposed to be generally parallel with a fuselage of the tiltrotor aircraft to configure the tiltrotor aircraft in a stowed position.

14. The method of claim 1, wherein the unlocking comprises disengaging a pin from the first rotor blade.

15. The method of claim 14, wherein the pin is disengaged manually.

16. The method of claim 14, wherein the pin is disengaged automatically by the tiltrotor aircraft.

17. The method of claim 1, wherein the rotating is performed by a rotor phasing unit of the tiltrotor aircraft.

18. The method of claim 1, wherein the rotating is performed manually.

19. The method of claim 17, wherein the rotating comprises attaching a motor to a gearbox of the tiltrotor aircraft.

20. The method of claim 1, wherein the restraining comprises tethering the first rotor blade to the ground.

* * * * *